S. COLEMAN.
HARPOONING DEVICE.
APPLICATION FILED AUG. 6, 1909.
970,018.
Patented Sept. 13, 1910.
2 SHEETS—SHEET 1.
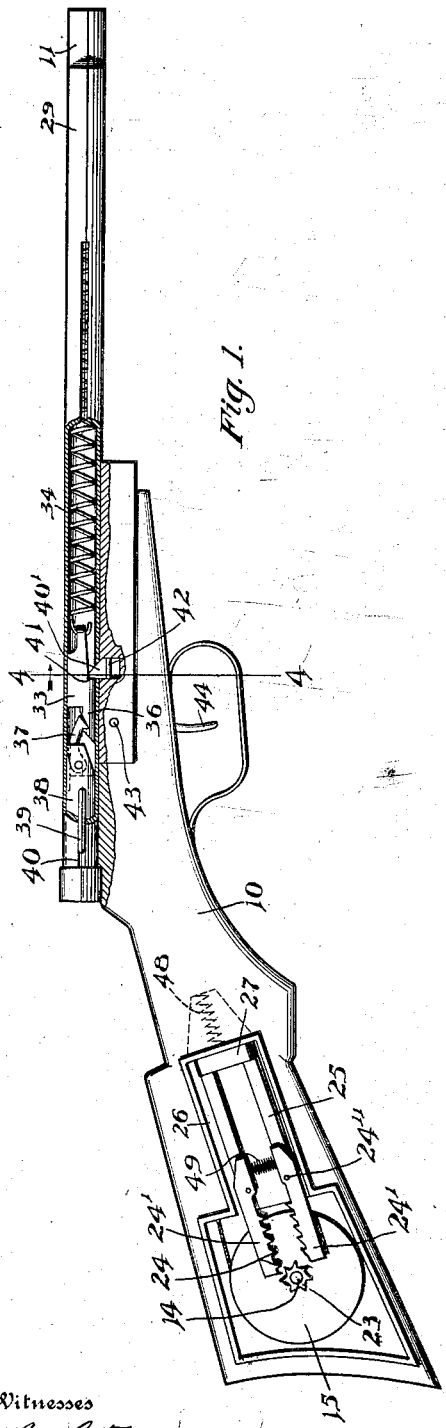
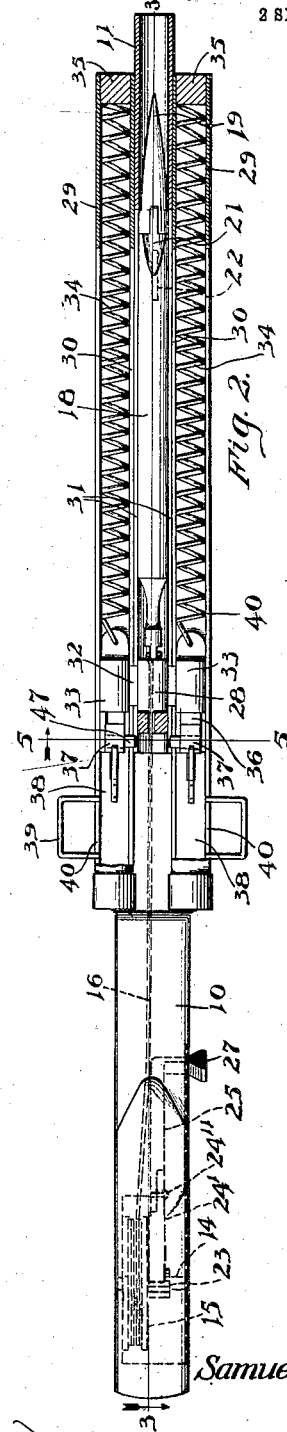
Inventor
Samuel Coleman, S. COLEMAN.
HARPOONING DEVICE.
APPLICATION FILED AUG. 6, 1909.
970,018.
Patented Sept. 13, 1910.
2 SHEETS—SHEET 2.
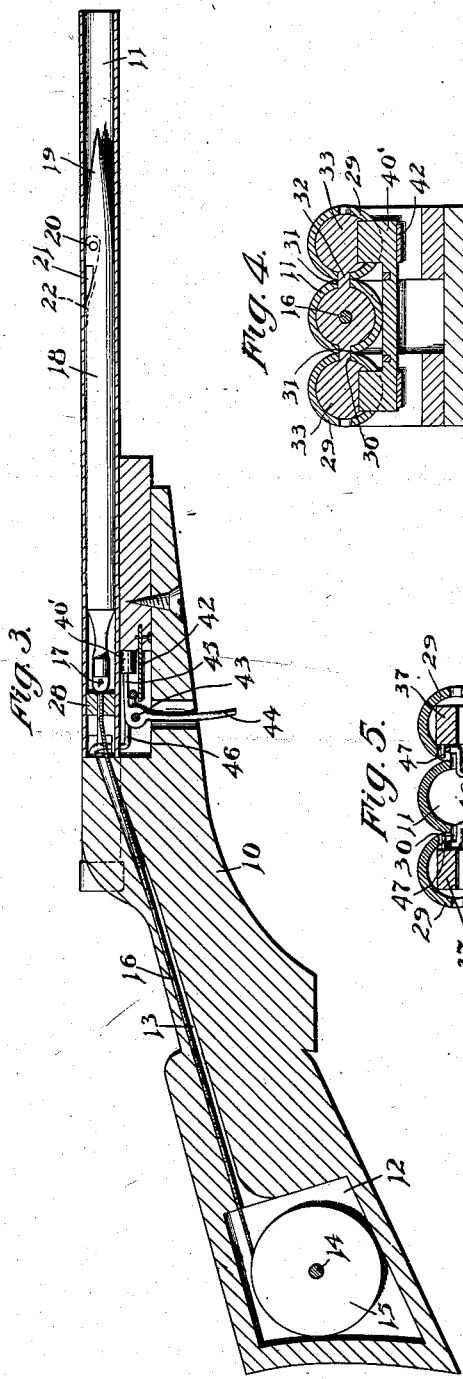
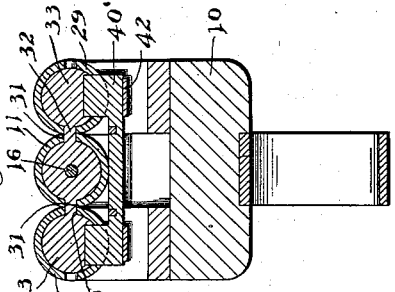
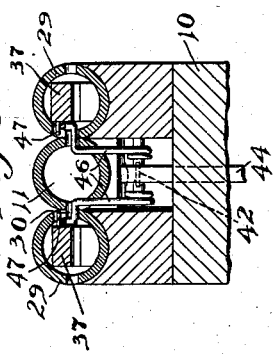
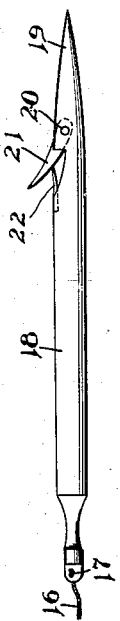
Witnesses
Inventor
Samuel Coleman,
By
Attorneys

UNITED STATES PATENT OFFICE.

SAMUEL COLEMAN, OF LEXINGTON, MISSISSIPPI, ASSIGNOR TO B. C. FARR, OF LEXINGTON, MISSISSIPPI.

HARPOONING DEVICE.

970,018.  Specification of Letters Patent. Patented Sept. 13, 1910.

Application filed August 6, 1909. Serial No. 511,544.

*To all whom it may concern:*

Be it known that I, SAMUEL COLEMAN, a citizen of the United States, residing at Lexington, in the county of Holmes, State of Mississippi, have invented certain new and useful Improvements in Harpooning Devices; and I do hereby declare the following to be a full, clear, and exact description of the invention, such as will enable others skilled in the art to which it appertains to make and use the same.

The invention relates to a device for harpooning fish and more particularly to the class of harpoon shooters.

The primary object of the invention is the provision of a device of this character in the form of a gun in which a harpoon is adapted to be inserted and that will be ejected therefrom by a trigger actuated spring mechanism to give the necessary velocity to the harpoon as it is ejected from the gun.

In connection with a device having the above characteristics, the invention aims as a further object to provide a novel construction, combination and arrangement of parts.

In the drawings accompanying and forming part of this specification is illustrated the preferred form of embodiment of the invention, which to enable those skilled in the art to practice the invention will be included in the following description, while the novelty of the invention will be pointed out in the claims succeeding the description. However it is to be understood that minor changes, variations and modifications may be made such as come properly within the scope of the appended claims, without departing from the spirit of the invention or sacrificing any of its advantages.

In the drawings:—Figure 1 is a side elevation of the invention the same being partly broken away. Fig. 2 is a top plan view thereof and partly in section. Fig. 3 is a sectional view on the line 3—3 of Fig. 2. Fig. 4 is a sectional view on the line 4—4 of Fig. 1 looking in the direction of the arrow. Fig. 5 is a sectional view on the line 5—5 of Fig. 2 looking in the direction of the arrow. Fig. 6 is a side elevation of the harpoon.

Similar reference characters indicate corresponding parts throughout the several views in the drawings.

In the drawings the numeral 10 designates the stock or handle of a gun constructed in accordance with the invention and the numeral 11 designates the main shooting barrel fixed to the stock or handle in any suitable manner. The stock or handle contains a chamber 12, the same having communication with the barrel 11, by a bore 13, which latter leads to the said barrel 11, through the inner end thereof. Journaled within the chamber 12, upon a spindle 14, is a winding and unwinding pulley 15, to which is connected a flexible cord 16, that is adapted to be wound thereon and unwound therefrom and this cord has its opposite end fixed to an eye 17, formed at the inner reduced end of a needle shaped harpoon 18, the opposite outer end of which being pointed as at 19, so that it will penetrate an object when contacting therewith. The harpoon 18, is adapted to be received in the barrel 11, and ejected therefrom in the manner as will be hereinafter described. Pivoted in a suitable recess in the harpoon by a pin 20, is a fin or catch wing 21 the same normally held projecting from one side of the harpoon by a spring 22 and this fin or wing prevents the free withdrawal of the harpoon when penetrated in an object.

Fixed to the spindle 14, of the pulley 15, is a pinion 23, which latter is adapted to be alternately engaged by opposed rack teeth 24, projecting inwardly toward each other from arms 24′ pivoted as at 24″ to a manually operable slide 25, movable in a guideway 26, at one side of the stock or handle 10, of the gun. Projecting at right angles from the slide is a finger piece 27, which is adapted to be gripped for actuating the slide to rotate the pulley for the winding of the flexible cord 16, thereon in loading the harpoon within the barrel of the gun.

Slidably mounted within the main barrel 11, is a circular follower block or striker member 28, the latter encircling the flexible cord 16 and disposed directly in rear of the harpoon 18, when loaded within the barrel of the gun.

On opposite sides of the barrel 11, and coextensive therewith for a greater portion of its length are hollow tubes or cylindrical casings 29, the same containing in their inner faces 11 elongated slots 30, which are in register with elongated slots 31, at diametrically opposite sides of the barrel 11, and slidable in these slots are uniting webs 32, connecting the follower block 28, with cylindrical blocks 33, slidably mounted within the tubes or casings 29, and to the forward ends of these blocks 33 are connected the inner ends of coiled retractile springs 34, the same being connected at their outer ends to plugs 35 closing the outer extremities of the tubes or casings. The said blocks 33, have rearwardly projecting hook catches 36, which latter are adapted to be engaged by pivotal dogs 37, mounted in slidable members 38, within the tubes or casings 29, in rear of the said blocks 33, and these members are formed with finger loops 39, which project outwardly through slots 40, extending longitudinally throughout a greater portion of the length of the tubes or casings 29, so that when the retractile springs 34, have shifted the striker or follower block 28, to the discharge end of the barrel 11, the said slide blocks 38, will be brought into engagement with the hook catches 36 of the blocks 33, and by the fingers of the hand of a person engaging the loops 39, can move the striker or follower block into normal cock position as will be hereinafter described.

In a suitable recess formed in the forward portion of the stock is a sear or tripping device 40′ which latter normally projects through the tubes 29, in the path of movement of the slidable blocks 33 to engage shoulders 41, formed thereon to lock the blocks in cocked position. To maintain the tripping device 40′ in its normal position there is provided a leaf spring 42, fixedly held in the recess for the tripping device. Directly in rear of the tripping device 40′, and mounted upon a pivot 43, is a trigger 44, the same having a forwardly extending right angular portion 45, engaging the tripping device to permit the latter to be released for freeing the slidable blocks 33, to allow the harpoon to be ejected from the gun.

Coiled about the pivot 43, is a wire member forming rearwardly and upwardly directed tripper arms 46, which latter engage lugs 47, integral with and projecting inwardly toward each other from the locking dog 37, so as to release the same from engagement with the hook catches 36 on the sliding blocks 33, when the latter have been brought to cocked position and engaged by the device.

In operation the follower blocks 33 are manually moved rearwardly within the tubes 29 against the tension of the retractile springs 34 and engaged with the trip device 40′ so that said blocks will be locked against movement while under the tension of the retractile springs. These blocks are moved rearwardly in the tubes by means of the sliding blocks 38 having the finger loops 39 to be engaged by an operator of the gun after said blocks 38 are made to automatically engage the hook ends 36 of the follower blocks 33 upon being shifted forwardly through the operation of the locking dogs 37. In moving the follower blocks 33 rearwardly the striker member 28 is also moved rearwardly, simultaneously therewith. The harpoon 18 is then drawn into the barrel 31 by actuating the slide rack 25 which rotates the pulley 15 causing the winding of the cable 16 thereon whereby, the rear end of the harpoon 18 will contact with the striker member so that in this manner the device is ready for the discharge of the said harpoon. The discharge of the harpoon 18 is effected by the trigger 44 which when actuated will simultaneously release the sliding blocks 38 from connection with the follower blocks 33 and the trip device 42 from engagement with the said follower blocks thereby freeing the same for the forward advancement thereof within the tubes 29 by the retractile springs 34 and due to the connection of the striker member 28 with the said follower blocks the harpoon 18 will be ejected under the force of the retractile springs 34 from the barrel 31 of the device. The sliding blocks 38 carry pivotal locking dogs 37 which are formed with inwardly projecting lugs, the locking dogs being adapted to engage with the rear hook ends 36 of the follower blocks 33, and to disengage the said locking dogs 37 from these hooks 36 it is necessary to pull upon the trigger 44 which will effect the rocking of the member 46, whereupon the ends thereof will engage with the lugs 47 and cause the locking dogs 37 to swing upwardly on their pivots and disengage from the hook ends 36 of the follower blocks 33 and thereby release the same from the sliding blocks.

Connected to the guideway 26 and to the slide 25 is a retractile spring 48 the latter being adapted to hold said slide forwardly of the pinion 23. The arms 24′ have connected to their inner ends an expansion spring 49 the same swung to hold the teeth 24 in position for engagement with the pinion 23 when the slide is being actuated. It will be noted that when one toothed arm 24′ is in engagement with the pinion 23 and actuating the same the other toothed arm 24′ is overriding the teeth of the said pinion, so that upon the reciprocation of said slide the pinion and pulley are rotated in one direction. The slide 25 is so constructed that its arms 24′ are of such length that they are normally out of engagement with the pinion 23.

What is claimed is:—

1. A device of the class described comprising a gun stock, a plurality of barrels arranged in fixed parallel relation to each other on said stock, a striker member longitudinally movable in one of said barrels, follower means arranged and movable in the other barrels and connected with said striker member, retractile means operative upon said follower means for forwardly advancing the same, manually operable members detachably connected with said follower means, a trip device arranged in the path of movement of the follower means and adapted to lock the same against the action of the retractile means, and trigger operated mechanism for simultaneously releasing the trip device and the manually operable members from the follower means whereby the latter will be freed for actuation by the retractile means.

2. In a device of the class described a gun barrel, a striker member, traversable therein, spring actuating follower means connected with said striker member, a trip device arranged in the path of movement of the follower means and engageable therewith for locking the same against movement by the spring, manually movable means engageable with the follower means to bring the same into engagement with the trip device, and means for simultaneously releasing the trip device and the manually movable means from said follower means.

3. The combination with a gun having a plurality of barrels, striker means slidable in one of said barrels, follower means slidable in the other barrels and having connection with said striker means, a trip device arranged in the path of movement of the follower means to lock the same against movement, means for advancing said follower means, manually operable means for bringing the follower means into engagement with the trip device, and means for simultaneously releasing the trip device and said manually operable means from engagement with the said follower means.

4. The combination with a gun having a plurality of barrels, of a striker element slidable in one of said barrels, follower blocks slidable in the other barrels, a spring controlled device for engagement with the follower blocks to hold the same against movement, connections between the follower blocks and the striker element, spring means connected with said follower blocks for forwardly advancing the same, finger actuated slidable blocks arranged in rear of the follower blocks, detachable connections between the slidable and follower blocks and a trigger for simultaneously releasing the said device from the follower blocks and the connections between the slidable and said follower blocks, whereby the latter may be freed for moving the striker element.

In testimony whereof, I affix my signature, in presence of two witnesses.

SAMUEL COLEMAN.

Witnesses:
O. F. HOSEA,
R. G. ANDERSON.